(12) United States Patent
Toeroe et al.

(10) Patent No.: US 11,757,696 B2
(45) Date of Patent: Sep. 12, 2023

(54) METHODS FOR DEFINING A NETWORK SERVICE DESCRIPTOR (NSD) FOR A NETWORK SERVICE (NS), AND NETWORK FUNCTIONS VIRTUALIZATION (NFV) ORCHESTRATOR (NFVO) USING SAID NSD

(71) Applicant: TELEFONAKTIEBOLAGET LM ERICSSON (PUBL), Stockholm (SE)

(72) Inventors: Maria Toeroe, Montreal (CA); Haibin Chu, Princeton, NJ (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 47 days.

(21) Appl. No.: 16/757,735

(22) PCT Filed: Oct. 23, 2018

(86) PCT No.: PCT/IB2018/058273
§ 371 (c)(1),
(2) Date: Apr. 20, 2020

(87) PCT Pub. No.: WO2019/082085
PCT Pub. Date: May 2, 2019

(65) Prior Publication Data
US 2021/0194749 A1  Jun. 24, 2021

Related U.S. Application Data

(60) Provisional application No. 62/576,417, filed on Oct. 24, 2017.

(51) Int. Cl.
*H04L 41/0233* (2022.01)
*H04L 41/044* (2022.01)
(Continued)

(52) U.S. Cl.
CPC .......... *H04L 41/0233* (2013.01); *G06F 9/455* (2013.01); *H04L 41/044* (2013.01);
(Continued)

(58) Field of Classification Search
CPC ....... G06F 2009/45595; G06F 9/45558; G06F 2009/4557; G06F 9/5077;
(Continued)

(56) References Cited

U.S. PATENT DOCUMENTS 10,469,317 B1 * 11/2019 Jiang .................... G06F 8/60
10,999,219 B1 *  5/2021 Athreyapurapu ... H04L 41/0806
(Continued)

FOREIGN PATENT DOCUMENTS

CN    104253866 A   12/2014
CN    106533714 A    3/2017
(Continued)

OTHER PUBLICATIONS

ONAP Wiki, NSD Information Model Specification for Open-O, https://wiki.onap.org/download/attachments/10780689/NSD%20Infomation%20Model%20Specification%20for%20Open-O.pdf?version=1&modificationDate=1506060324000&api=v2 (Jul. 7, 2017) (Year: 2017).*
(Continued)

*Primary Examiner* — Kamal B Divecha
*Assistant Examiner* — Alex H. Tran
(74) *Attorney, Agent, or Firm* — Christopher & Weisberg, P.A.

(57) ABSTRACT

There are provided methods for defining a Network Service Descriptor (NSD) for a Network Service (NS), and Network Functions Virtualization (NFV) Orchestrator (NFVO) using said NSD. The NSD comprises zero, one or more of each of: a Virtualized Network Function (VNF) Descriptor (VNFD), a Physical Network Function (PNF) Descriptor (PNFD), a
(Continued)

Network Service Descriptor (NSD), a Virtual Link (VL) Descriptor (VLD), and a VNF Forwarding Graph Descriptor (VNFFGD). One method comprising the step of defining at least one Connection Points (CP) Profile, wherein the CP Profile is referenced through a cpProfileId in a Network Forwarding Path Descriptor (NFPD) attribute of the VNFFGD, the CP Profile specifying a Connection Point Descriptor (CPD) or Service Access Point Descriptor (SAPD) for a given VnfProfile, PnfProfile or NsProfile.

6 Claims, 11 Drawing Sheets

(51) Int. Cl.
  *H04L 41/046* (2022.01)
  *H04L 41/5041* (2022.01)
  *G06F 9/455* (2018.01)
(52) U.S. Cl.
  CPC ........ *H04L 41/046* (2013.01); *H04L 41/5045* (2013.01); *G06F 2009/4557* (2013.01); *G06F 2009/45575* (2013.01); *G06F 2009/45591* (2013.01); *G06F 2009/45595* (2013.01)
(58) Field of Classification Search
  CPC ........... G06F 2009/45562; G06F 9/455; G06F 2009/45575; G06F 8/60; G06F 9/45533; H04L 41/0806; H04L 41/5051; H04L 41/5048; H04L 41/5041; H04L 41/0803; H04L 41/0843; H04L 41/5045; H04L 63/102
  See application file for complete search history.

(56) References Cited

U.S. PATENT DOCUMENTS

| | | | | |
|---|---|---|---|---|
| 2018/0324261 | A1* | 11/2018 | Yi | H04L 41/0853 |
| 2019/0238425 | A1* | 8/2019 | Mladin | H04L 41/5048 |
| 2019/0280938 | A1* | 9/2019 | Chou | H04L 41/0806 |
| 2020/0014582 | A1* | 1/2020 | Chou | H04W 28/16 |
| 2020/0186442 | A1* | 6/2020 | Nazarzadeoghaz | H04L 41/5048 |
| 2020/0313981 | A1* | 10/2020 | Chatras | H04L 41/5058 |

FOREIGN PATENT DOCUMENTS

| | | |
|---|---|---|
| CN | 106685679 A | 5/2017 |
| EP | 3291499 A1 | 3/2018 |
| RU | 2382398 C2 | 8/2005 |
| WO | 2016041360 A1 | 3/2016 |
| WO | 2016/121834 A1 | 8/2016 |
| WO | 2016131172 A1 | 8/2016 |
| WO | 2016184045 A1 | 11/2016 |

OTHER PUBLICATIONS

Vanderstraeten et al., Network Service Descriptors as a Factory, https://www.nctatechnicalpapers.com/Paper/2017/2017-network-service-descriptors-as-a-factory/download (Oct. 17-20, 2017) (Year: 2017).*
M. Mechtri, C. Ghribi, O. Soualah and D. Zeghlache, "NFV Orchestration Framework Addressing SFC Challenges," in IEEE Communications Magazine, vol. 55, No. 6, pp. 16-23, Jun. 2017, doi: 10.1109/MCOM.2017.1601055 (Year: 2017).*
M. Mechtri, I. G. Benyahia and D. Zeghlache, "Agile service manager for 5G," NOMS 2016-2016 IEEE/IFIP Network Operations and Management Symposium, 2016, pp. 1285-1290, doi: 10.1109/NOMS.2016.7503004 (Year: 2016).*
Oracle, Oracle Communications Network Service Orchestration Implementation Guide, Release 7.3.5, E80746-01, https://docs.oracle.com/communications/E80745_01/doc.735Ze80746.pdf (Feb. 18, 2017) (Year: 2017).*
ETSI, Network Functions Virtualisation (NFV) Release 2; Management and Orchestration; Network Service Templates Specification https://www.etsi.org/deliver/etsi_gs/NFV-IFA/001_099/014/02.03.01_60/gs_NFV-IFA014v020301p.pdf (Jun. 27, 2017) (Year: 2017).*
ONAP Wiki, NSD Information Model Specification V0.1, https://wiki.onap.org/download/attachments/8230085/NSD%20Information%20Model%20Specification%20v0.1.pdf?version=1&modificationDate=1499420831000&api=v2 (Jul. 7, 2017) (Year: 2017).*
ETSI, Network Functions Virtualisation (NFV) Release 2; Management and Orchestration; Network Service Templates Specification https://www.etsi.org/deliver/etsi_gs/nfv-ifa/001_099/014/02.03.01_60/gs_nfv-ifa014v020301p.pdf (Aug. 31, 2017) (Year: 2017).*
ETSI GS NFV-IFA 014, V2.3.1: "Network Functions Virtualisation (NFV) Release 2; Management and Orchestration; Network Service Templates Specification"; Aug. 2017; 36 pages.
ETSI GS NFV-IFA 014, V3.1.1: "Network Functions Virtualisation (NFV) Release 3; Management and Orchestration; Network Service Templates Specification"; Aug. 2018; 44 pages.
ETSI GS NFV-MAN 001, V1.1.1: "Network Functions Virtualisation (NFV); Management and Orchestration"; Dec. 2014; 184 pages.
Chinese Office Action and English translation of the text of the Chinese Office Action dated Apr. 19, 2022 issued in corresponding Chinese Application No. 201880069054X, consisting of 12 pages.
Australian Office Action dated Oct. 31, 2022 issued in corresponding Australian Patent Application No. 2021245203, consisting of 3 pages.
ETSI GS NFV-IFA 011 V2.3.1 (Aug. 2017) Network Functions Virtualisation (NFV) Release 2; Management and Orchestration; VNF Packaging Specification, consisting of 56 pages.
Communication Pursuant to Article 94(3) EPC dated Nov. 16, 2022 issued in European Patent Application No. 18 807 694.7, consisting of 5 pages.
Chinese Office Action dated Dec. 2, 2022 issued in Chinese Patent Application No. 201880069054X and English translation of the text of the Chinese Office Action, consisting of 6 pages.
3GPP TSG SA WG5 (Telecom Management) Meeting #107 S5-163201; revision of S5-16xabc; Source: Huawei; Title: Adding Requirements for Affinity and Anti-Affinity Information; Document for: Approval; Agenda Item: 6.5.1.5; May 23-27, 2016, Santa Cruz de Tenerife (Spain), consisting of 5 pages.

* cited by examiner allowing abstract entities as indirect references in place of direct references in the NSD wherein the direct references are any of Virtualized Network Function (VNF) Descriptor (VNFD), Physical Network Function (PNF) Descriptor (PNFD), Network Service Descriptor (NSD) and Virtual Link (VL) Descriptors (VLD)   731

791 defining at least one Connection Points (CP) Profile, wherein the CP Profile is referenced through a cpProfileId in a Network Forwarding Path Descriptor (NFPD) attribute of the VNFFGD; the CP Profile specifying a Connection Point Descriptor (CPD) or Service Access Point Descriptor (SAPD) for a given VnfProfile, PnfProfile or NsProfile

Figure 7d

METHODS FOR DEFINING A NETWORK SERVICE DESCRIPTOR (NSD) FOR A NETWORK SERVICE (NS), AND NETWORK FUNCTIONS VIRTUALIZATION (NFV) ORCHESTRATOR (NFVO) USING SAID NSD

PRIORITY STATEMENT UNDER 35 U.S.C. S.119(E) & 37 C.F.R. S.1.78

This non-provisional patent application claims priority based upon the prior U.S. provisional patent application entitled "Specifying Different Virtual Network Function (VNF) Instances in Different Roles within a Network Service (NS)", application No. 62/576,417, filed Oct. 24, 2017, in the names of TOEROE et al.

TECHNICAL FIELD

The present disclosure relates to Network Services and corresponding Network Service Descriptors.

BACKGROUND

To provide a Network Service (NS) the Network Function Virtualization (NFV) Framework and in particular the NFV Orchestrator (NFVO) require as an input the specification of the NS Descriptor (NSD) of the NS. The Network Service Descriptor (NSD) is a deployment template which consists of information used by the NFVO for life cycle management of an NS. Reference is made to the document ETSI GS NFV-IFA 014 V2.3.1 (2017-08) for further description and explanations of the different concepts discussed herein. This NSD references the Virtual Network Functions (VNFs), the Physical Network Functions (PNFs), any nested NS, the Virtual Links (VLs) and the Service Access Points (SAPs) through their respective descriptors: VNF Descriptor (VNFD), PNF Descriptor (PNFD), NS Descriptor (NSD), VL Descriptor (VLD) and SAP Descriptor (SAPD). These descriptors can be considered as entity type definitions of which entities can be instantiated at runtime.

The VNFD describes what kind of VNFs can be instantiated at runtime from the software package associated with the VNFD. The NSD also includes the VNF Forwarding Graphs (VNFFGs) and Network Forwarding Paths (NFPs) describing the topology and forwarding paths between the VNFs, PNFs and nested NSs composing the NS being described. In turn, a VNFFG or a NFP also references the different entities and Connection Points (CPs) (via CP Pools) using the appropriate descriptors, e.g. VLDs and Connection Points Descriptors (CPDs).

FIG. 1 illustrates the simplified UML diagram 100 of these descriptors.

In addition, it is possible to define NS deployment flavours (NSDFs) in the NSDs, each flavour specifying the eligible composing entities for the flavour through the entities profiles. An entity profile references the descriptor of its entity type, and its flavour. E.g. a VNF profile references a VNFD and its flavour, and defines the number VNF instances to be created from that VNFD with that flavour in the given NS flavour. It may also specify the collocation policies and the connectivity of these VNF instances within the NS. A flavour is somewhat like a size, depending on for what entity it is defined. For a NSD the flavour is the number of VNFs, PNFs and nested NSs with their flavours. For a VNF, the flavour indicates the range of VNF Component (VNFC) instances and their flavours. For a VNFC the flavour indicates the size of the virtual memory, CPU, storage etc. In the VNFD, the VNFC flavour is represented by a Virtual Deployment Unit (VDU).

The NSD as described above is used to specify the NS that the NFVO should deploy when it is being requested to do so. Which means that whenever a descriptor is referenced, it indicates the entity type of the instance to be deployed and for which the number of instances is given in the applicable flavour descriptor.

All instances of an entity type are deployed with the same interconnections. Any modification to the interconnections is possible only through runtime updates to the running instances.

SUMMARY

There currently exist certain challenge(s). Using the descriptors directly in the NSD and in its composing elements means that, at the time of the design of the NSD, only the type of the entities can be specified. This is particularly problematic for the VNFFGs and NFPs. This is because the same descriptor, which is of a given type, is referenced for each instance of a type within a VNFFG/NFP. One cannot specify a different role and/or connectivity for each different instance of a given type.

There is provided a method for defining a Network Service Descriptor (NSD) for a Network Service (NS), the NSD comprising zero, one or more of each of: a Virtualized Network Function (VNF) Descriptor (VNFD), a Physical Network Function (PNF) Descriptor (PNFD), a Network Service Descriptor (NSD), a Virtual Link (VL) Descriptor (VLD), and a VNF Forwarding Graph Descriptor (VNFFGD). The method comprises defining at least one Connection Points (CP) Profile, wherein the CP Profile is referenced through a cpProfileId in a Network Forwarding Path Descriptor (NFPD) attribute of the VNFFGD; the CP Profile specifying a Connection Point Descriptor (CPD) or Service Access Point Descriptor (SAPD) for a given VnfProfile, PnfProfile or NsProfile.

In the method, a usage of CP profiles may enable differentiating multiple CPDs or SAPDs specified in a same VNFD, PNFD or NSD that are applicable to different VNF, PNF or NS instances derived from the same VNFD, PNFD or NSD. In the method, the CP Profile may be an information element comprising at least one CP Profile Identifier (ID) uniquely identifying the CP Profile; zero or one VNF Profile ID referencing to a VNF Profile of a constituent VNF; zero or one VNF external CPD identifier of a VNF external CPD for the VNF profile; zero or one PNF Profile ID referencing to a PNF Profile of a constituent PNF; zero or one PNF external CPD identifier of a PNF external CPD for the PNF Profile; zero or one NS Profile ID referencing to a NsProfile of a nested NS; and zero or one NS SAPD ID of the NS SAPD for the NsProfile.

There is provided a method for defining a Network Service Descriptor (NSD) for a Network Service (NS). The NSD comprises zero, one or more Virtualized Network Function (VNF) Descriptor (VNFD), zero, one or more Physical Network Function (PNF) Descriptor (PNFD), wherein information contained within the PNFD is limited to a description of connectivity requirements to integrate PNFs in the NS, zero, one or more nested Network Service Descriptor (NSD), wherein the zero, one or more NSD references either one VNFD or a nested NSD, zero, one or more Virtual Link (VL) Descriptors (VLD), and zero, one or more VNF Forwarding Graph Descriptors (VNFFGD), the VNFFGD describing a topology or a portion of the NS. The method comprises defining at least one Connection Points (CP) Profile, wherein the CP Profile is referenced through a cpProfileId in a Network Forwarding Path Descriptor (NFPD) attribute of the VNFFGD; the CP Profile specifying a Connection Point Descriptor (CPD) or Service Access Point Descriptor (SAPD) for a given VnfProfile, PnfProfile or NsProfile.

In the method, a usage of CP profiles may enable differentiating multiple CPDs or SAPDs specified in a same VNFD, PNFD or NSD that are applicable to different VNF, PNF or NS instances derived from the same VNFD, PNFD or NSD. In the method, the CP Profile may be an information element comprising: at least one CP Profile Identifier (ID) uniquely identifying the CP Profile; zero or one VNF Profile ID referencing to a VNF Profile of a constituent VNF; zero or one VNF external CPD identifier of a VNF external CPD for the VNF profile; zero or one PNF Profile ID referencing to a PNF Profile of a constituent PNF; zero or one PNF external CPD identifier of a PNF external CPD for the PNF Profile; zero or one NS Profile ID referencing to a NsProfile of a nested NS; and zero or one NS SAPD ID of the NS SAPD for the NsProfile.

There is provided a Network Functions Virtualisation (NFV) Orchestrator (NFVO) executed on a network node comprising processing circuitry and a memory, the memory containing instructions executable by the processing circuitry whereby the NFVO is operative to instantiate a Network service (NS) defined by a Network Service Descriptor (NSD). The NSD comprises zero, one or more of each of: a Virtualized Network Function (VNF) Descriptor (VNFD), a Physical Network Function (PNF) Descriptor (PNFD), a Network Service Descriptor (NSD), a Virtual Link (VL) Descriptor (VLD), and a VNF Forwarding Graph Descriptor (VNFFGD). The NSD comprises at least one Connection Points (CP) Profile, wherein the CP Profile is referenced through a cpProfileId in a Network Forwarding Path Descriptor (NFPD) attribute of the VNFFGD, the CP Profile specifying a Connection Point Descriptor (CPD) or Service Access Point Descriptor (SAPD) for a given VnfProfile, PnfProfile or NsProfile.

There is provided a Network Functions Virtualisation (NFV) Orchestrator (NFVO) executed on a network node comprising processing circuitry and a memory, the memory containing instructions executable by the processing circuitry whereby the NFVO is operative to instantiate a Network service (NS) defined by a Network Service Descriptor (NSD). The NSD comprises: zero, one or more Virtualized Network Function (VNF) Descriptor (VNFD), zero, one or more Physical Network Function (PNF) Descriptor (PNFD), wherein information contained within the PNFD is limited to a description of the connectivity requirements to integrate PNFs in the NS, zero, one or more nested Network Service Descriptor (NSD), wherein the zero, one or more NSD references either one VNFD or a nested NSD, zero, one or more Virtual Link (VL) Descriptors (VLD), and zero, one or more VNF Forwarding Graph Descriptors (VNFFGD), the VNFFGD describing a topology or a portion of the NS. The NSD comprises at least one Connection Points (CP) Profile, wherein the CP Profile is referenced through a cpProfileId in a Network Forwarding Path Descriptor (NFPD) attribute of the VNFFGD, the CP Profile specifying a Connection Point Descriptor (CPD) or Service Access Point Descriptor (SAPD) for a given VnfProfile, PnfProfile or NsProfile.

The methods and NFVO provided herein present improvements to the way methods for defining a NSD for a NS and NFVO using said NSD operate.

BRIEF DESCRIPTION OF THE DRAWINGS

FIG. 7b is a flowchart of a method according to an embodiment.

FIG. 7d is a flowchart of a method according to an embodiment.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As stated previously, using the descriptors directly in the NSD and in its composing elements means that, at the time of the design of the NSD, only the type of the entities can be specified. This is particularly problematic for the VNFFGs and NFPs. This is because the same descriptor, which is of a given type, is referenced for each instance of a type within a VNFFG/NFP. One cannot specify a different role and/or connectivity for each different instance of a given type.

For example, there is a VNF providing the database function (DB) (entity type VNFD-DB) and there are two different VNFs A and B (entity types VNFD-A and VNFD-B), which need the DB function for different purposes. The NSD uses descriptors, which are like entity types. If the VNFFG and the NFP are considered as expressions, those are built out of types e.g. VNFD-DB. These types do not provide information distinguishing enough, and because of this it cannot be determined which DB instance is being used and where. The following description in relation with FIGS. 2 to 5 illustrates this problem in more details.

Figure 1:
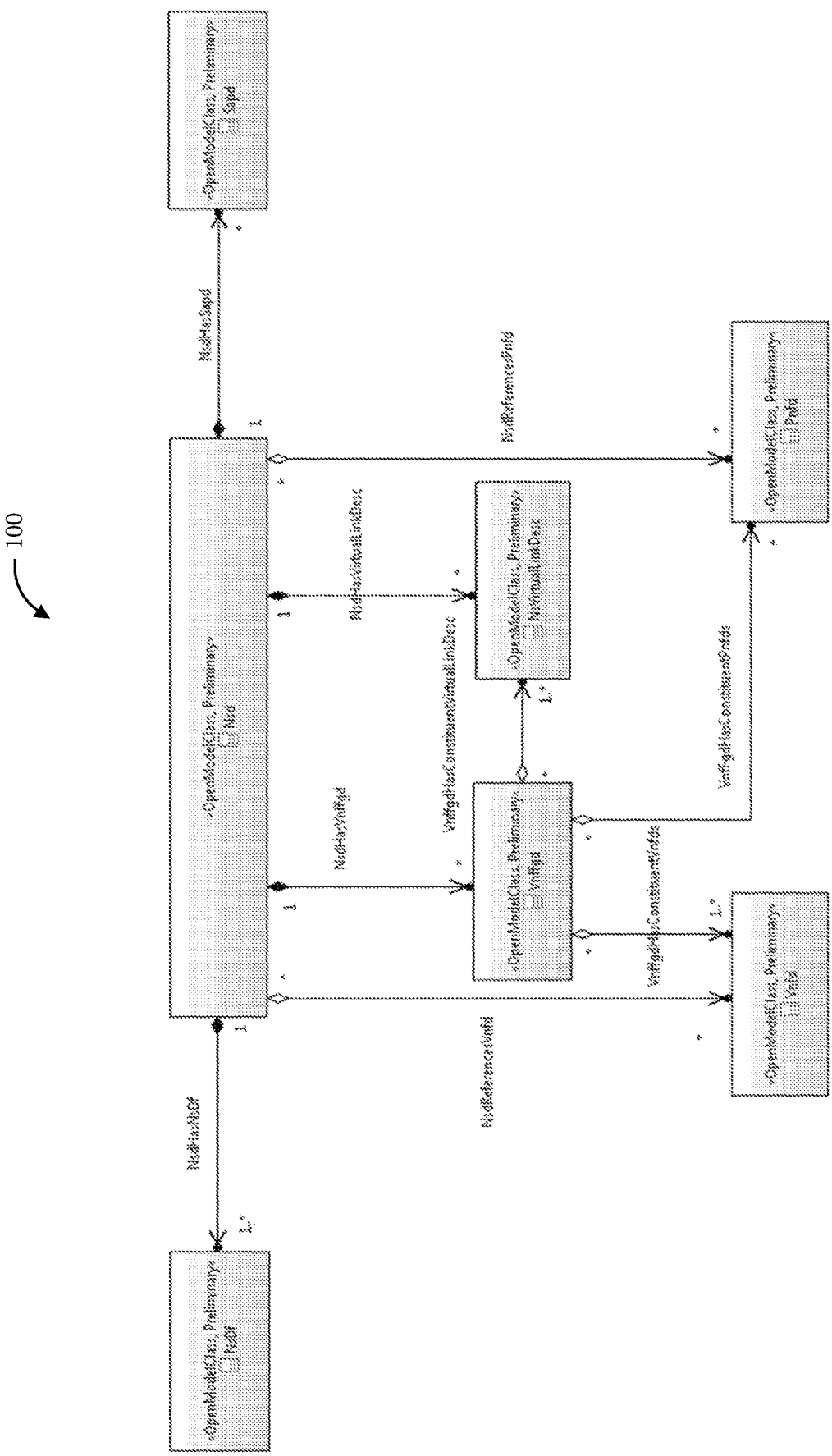
FIG. 1 is the Unified Modeling Language (UML) information diagram of for a NSD as defined in ETSI GS NFV-IFA 014 V2.3.1 (2017-08).
Figure 2:
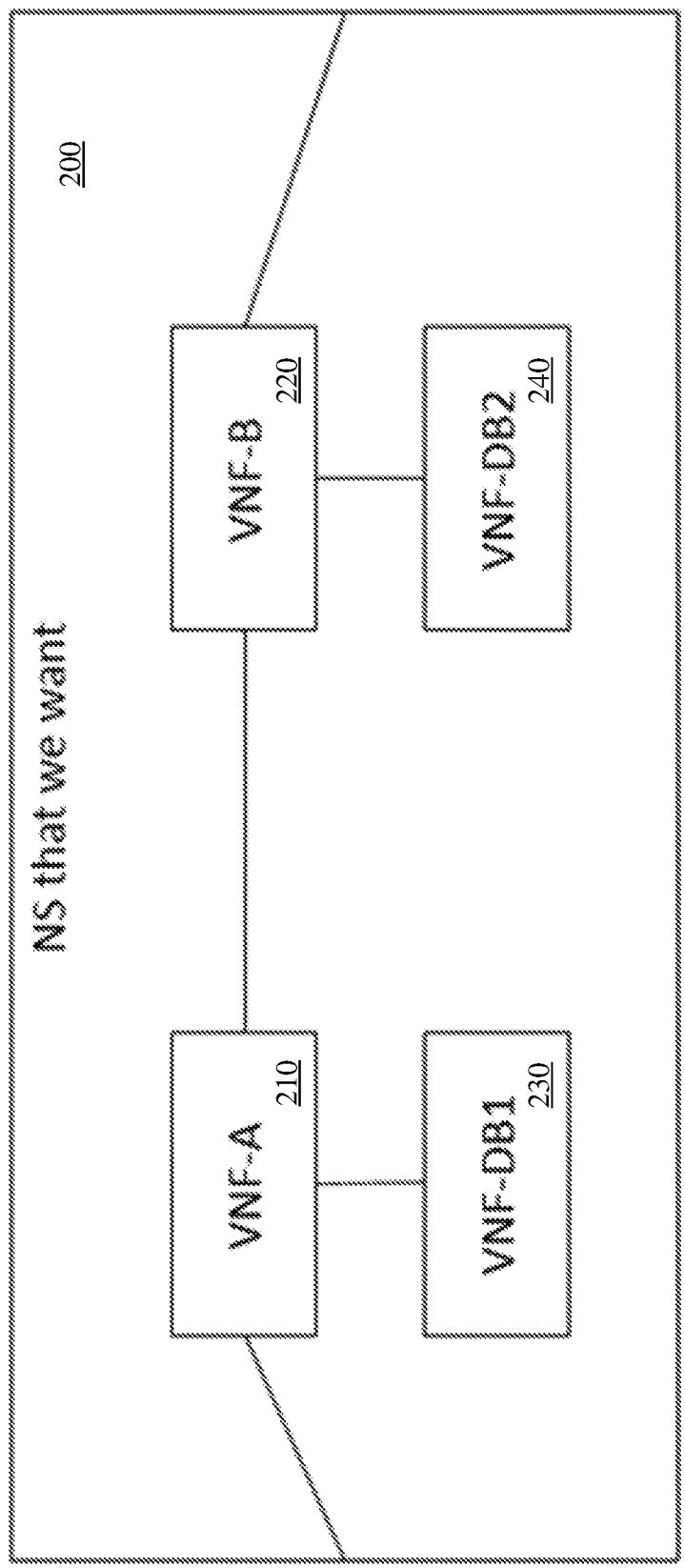
FIG. 2 is a diagram illustrating an example NS that needs to be specified.

FIG. 2 illustrates the wanted NS 200. If the wanted NS 200 needs to have the functionalities of both VNF-A 210 and VNF-B 220, together, each VNFs requires its own instance of DB. One DB instance VNF-DB1 230 needs to be connected to VNF-A 210, composing a first NFP, and a second DB instance VNF-DB2 240 needs to be connected to VNF-B 220, composing a second NFP.

Figure 3:
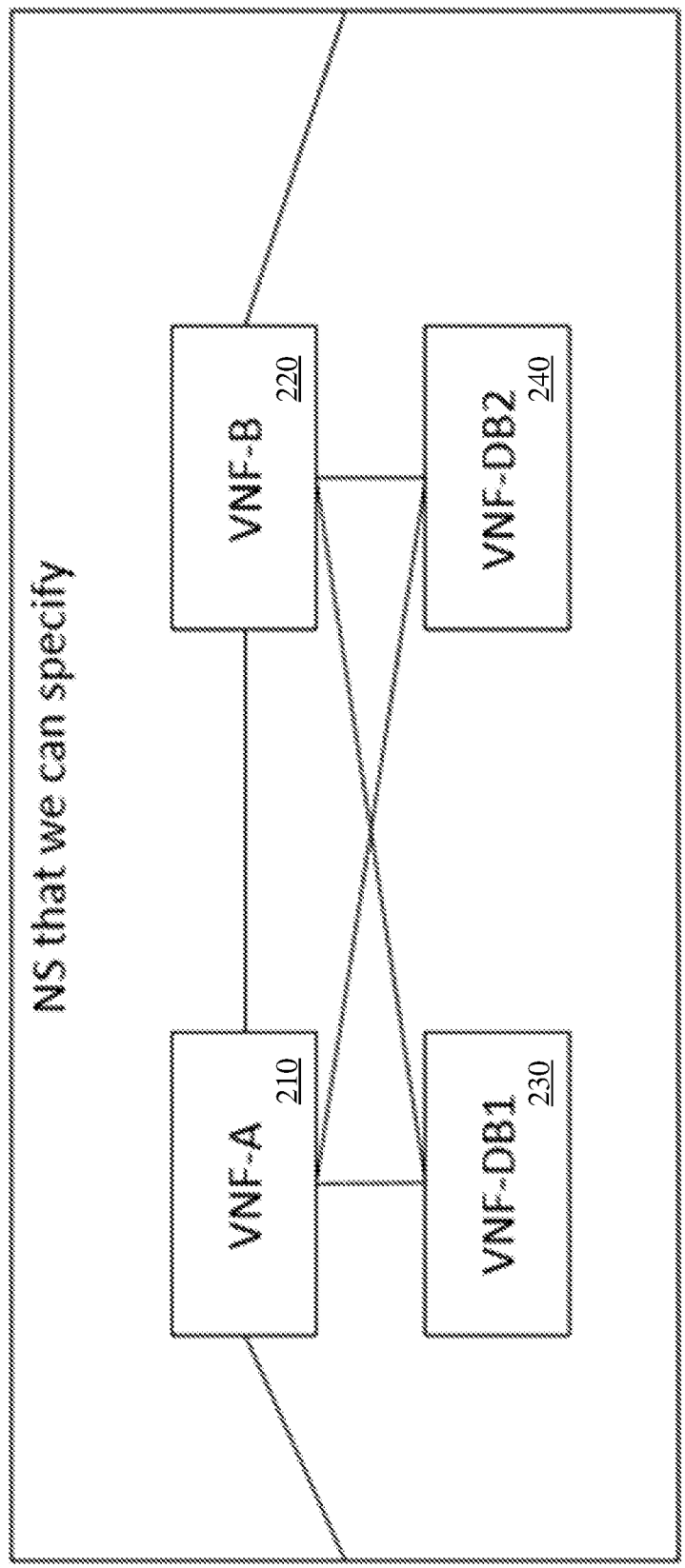
FIG. 3 is a diagram illustrating an example NS that can be specified with the NSD structure as defined in ETSI GS NFV-IFA 014 V2.3.1 (2017-08).
Figure 4:
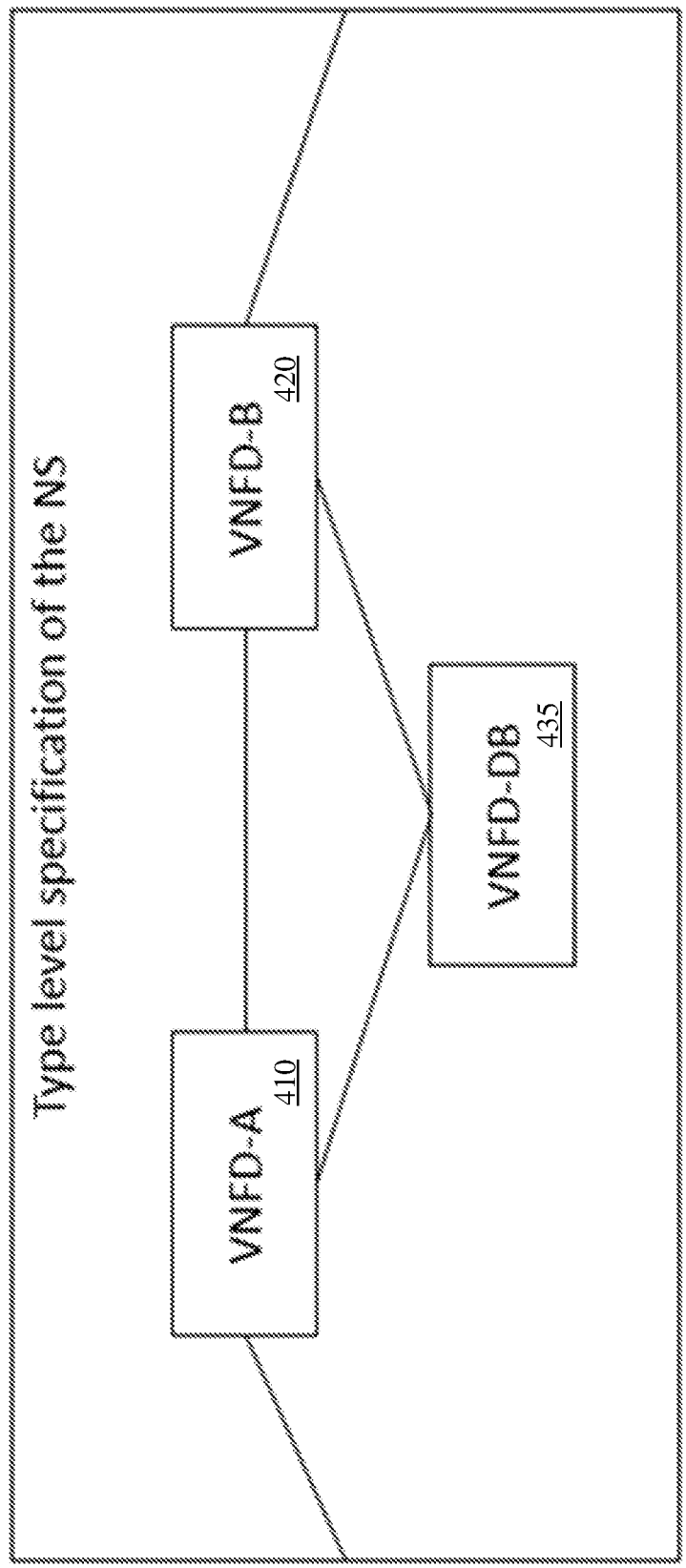
FIG. 4 is a diagram illustrating an example of the NSD specification at the type level.

However, since the VNFDs (and their CPDs) are referenced directly in the NFPs, which are the same in both cases, in the NSD it is not possible to describe these two NFPs as being independent. The same connections are used for both instances of the VNF-DB, VNF-DB1 230 and VNF-DB2 240, created at deployment time, such as illustrated in FIG. 3. I.e. the descriptor needs to interconnect the DB VNFD-DB 435 with both VNFD-A 410 and VNFD-B 420, such as illustrated in FIG. 4.

This is highly ambiguous especially if the VNFFG and the NFPs are used to define the traffic forwarding pattern in the deployment. The NFP defines the forwarding rules for the interconnection of the VNFs. Two different NFPs are needed for the example of FIG. 2. One for the connection of VNF-A to VNF-DB1 and the other for the connection of VNF-B to VNF-DB2. But, in both, the same type i.e. VNFD-DB is used, so it is not possible to make the distinction at the type level. Hence the abstract entities are introduced.

Certain aspects of the present disclosure and their embodiments may provide solutions to these or other challenges. It is proposed to replace the direct references used in the NSD and its VNF Forwarding Graph Descriptor (VNFFGD) and Network Forwarding Path Descriptors (NFPDs) to the entity types (i.e. VNFD, PNFD, NSD, CPD) with indirect references through abstract entities of the given entity type and to allow multiple such abstract entities for each entity type. This change is not made in the VNFFGD and NFPD per say; if the abstract entities need to be defined, the abstract entities can be defined in the NSD (similar to the profiles). Then these abstract entities can be used in the VNFFGD and NFPD. This way, a different abstract entity is defined in the VNFFGDs and NFPDs each time an instance of an entity type is used differently. For each different role/function ("DB for A" and "DB for B" are considered as two different roles) an entity of a given type (e.g. VNFD-DB) is used in the NS with a different interconnection (e.g. one DB instance is connected to A, the other is connected to B) and a new corresponding abstract entity is defined (e.g. DB1:VNFD-DB and DB2:VNFD-DB as illustrated in FIG. 5, which uses the notation :<entity type>, where the entity type is a descriptor).

Figure 5:
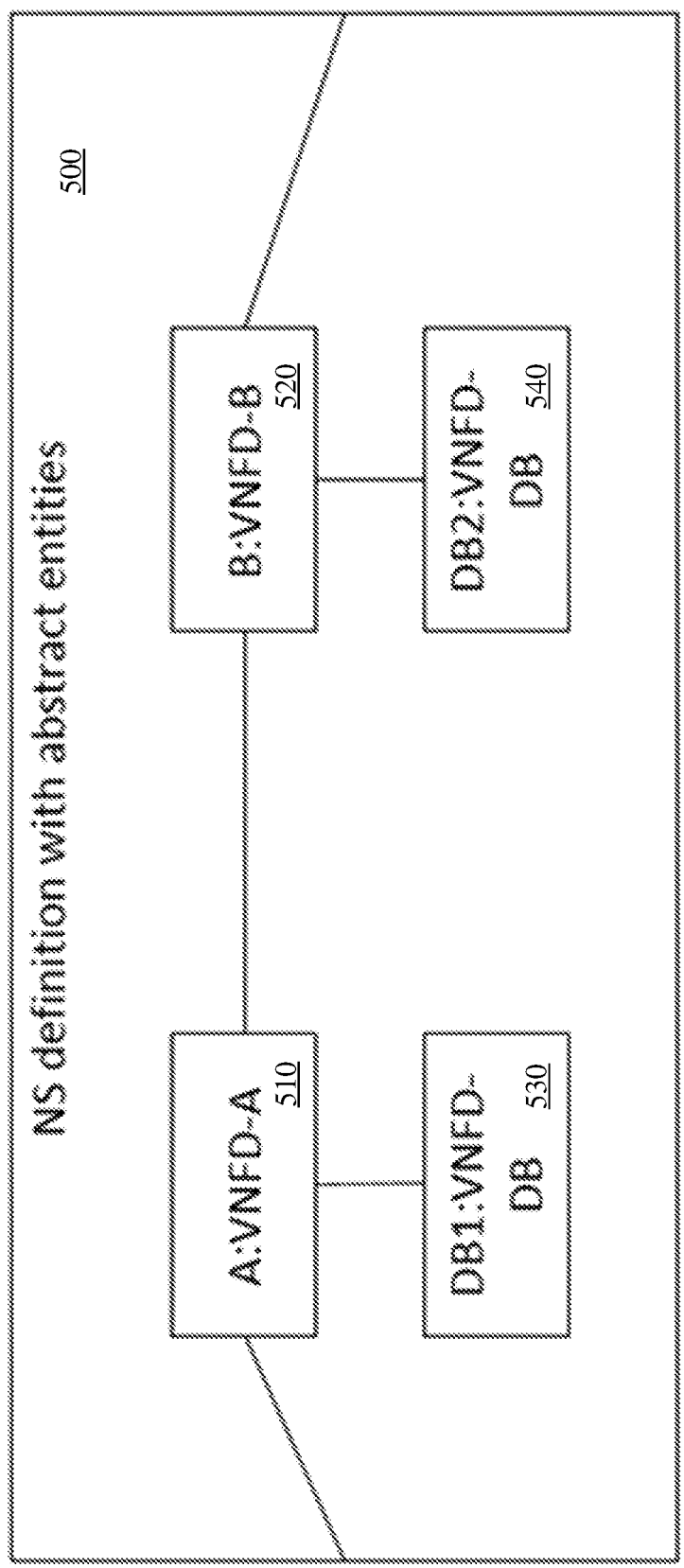
FIG. 5 is a diagram illustrating an example of the NSD with abstract entities.

FIG. 5 illustrates a NS Descriptor 500 with four abstract VNF entities (A 510, B 520, DB1 530, DB2 540) belonging to three VNF types (VNFD-A, VNFD-B, VNFD-DB). Their topology is described by a VNFFG which, using the abstract entities, can indicate that the DB1 entity 530 of the VNFD-DB is connected to the abstract entity A 510 of VNFD-A, and that the DB2 entity 540 of the VNFD-DB is connected to the abstract entity B 520 of VNFD-B. When this NSD is deployed by the NFVO, at least one VNF instance is created for each abstract VNF entity, resulting in the wanted deployment illustrated in FIG. 2.

Figure 6:
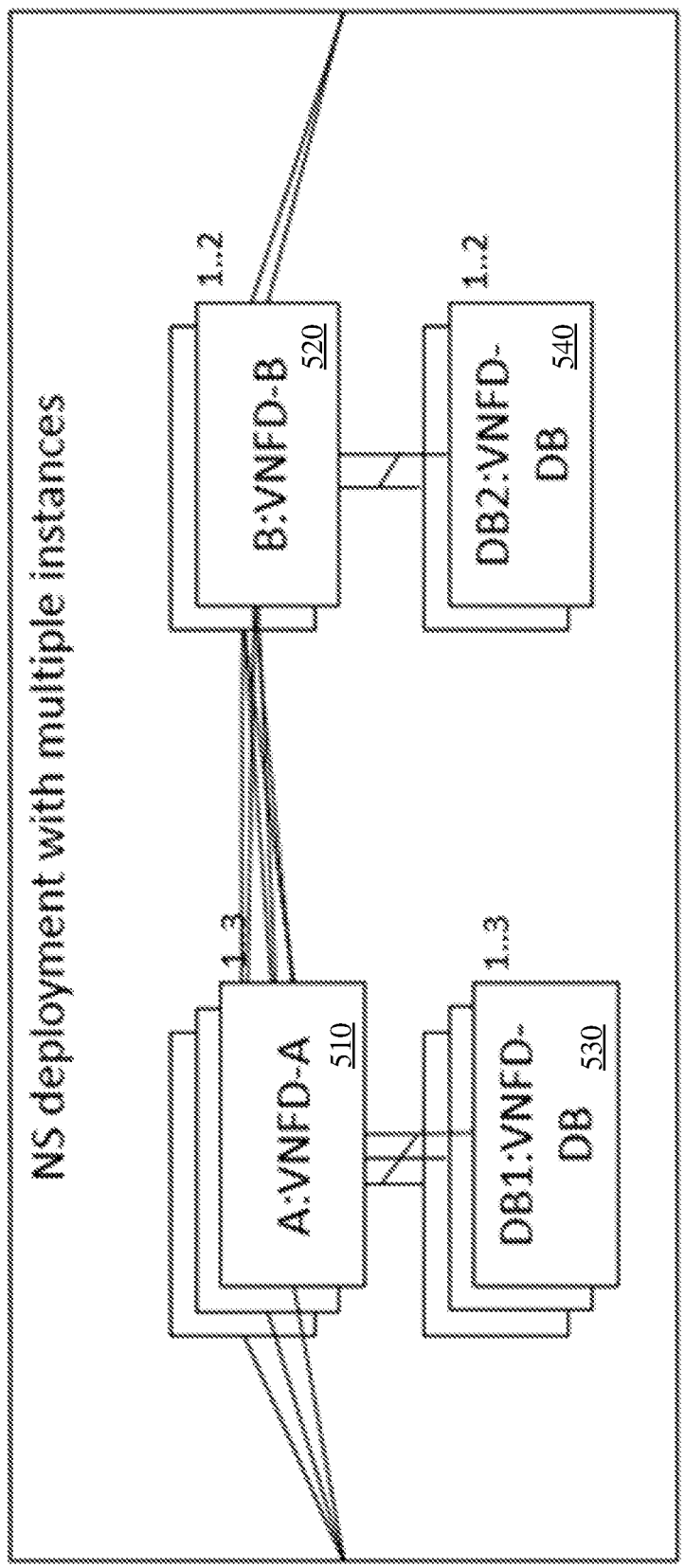
FIG. 6 is a diagram illustrating the configuration of VNF instances created from the NSD associated with the NS of the FIG. 5.

In addition, it is possible to specify, for each abstract entity, a range of instances to be used at deployment time—i.e. a flavour. These instances can be deployed in the same role with the same interconnections as shown in the example of FIG. 6. I.e. abstract entities A:VNFD-A 510 and DB1:VNFD-DB 530 have the range of 1.3, indicating that at least one instance of each should be deployed and no more than 3 is allowed to be deployed. For DB2:VNFD-DB 540 and B:VNFD-B 520 the range is 1.2.

At the type level this means that VNFD-DB can have a total of at least 2 instances and at most 5 instances and it is not possible to distinguish how many of these instances may participate in each role (i.e. serving A and serving B). At the type level it is also not possible to specify different forwarding rules for the traffic going through these instances. However, through the new abstract entities introduced herein different forwarding paths can be defined (one for the interconnection of A and the DB1 abstract entities and one for the interconnection of B and the DB2 abstract entities) with different forwarding rules for each path.

An implementation of this approach can be included in the ETSI NFV NSD specification (NFV-IFA 014) with the reuse of the entity profile construct as the definition of an abstract entity. As such, the NSD and its VNFFGs and NFPs can reference any one of the VNF, PNF, nested NS, VL, CP and SAP Profiles. Although an example was provided for interconnecting VNFs, some of which being of DB type, a person skilled in the art will understand that the principles taught herein can be applied to other types of entities which need to be used in different roles/interconnections.

According to an embodiment, the ETSI standard ETSI GS NFV-IFA 014 is modified as explained below.

It is proposed to introduce the VnfProfile/PnfProfile/NsProfile concepts into the Vnffgd and Nfpd information elements to serve different traffic profiles based on the same VNFD/PNFD/NSD.

Current design of Vnffgd and Nfpd information elements use the reference of VNFD, PNFD and nested NSD directly. It means that, at run time, the same type CP instances (based on a given CPD) of the same type of VNF/PNF instances (based on a given VNFD/PNFD) or the same type of SAP instances (based on a given SAPD) of the same type of nested NS instances (based on a given nested NSD) will either join the same NFP or not. This is not flexible enough and cannot fulfil the demand of multiple traffic profiles of application traffic that run on top of the VNFs. For example, current Nfpd specifies the CPD #A from VNFD #A joins the NFP #A during the design time. During the run time, if four VNF instances are instantiated based on VNFD #A, that means all CP instances based on CPD #A of these four VNF instances need to join NFP #A. If the user wants to specify two of these four VNF instances for NFP #A and the other two for NFP #B during the design time, current design of Vnffgd and Nfpd information elements cannot fulfil this requirement.

The VnfProfile/PnfProfile/NsProfile concept are therefore introduced into the Vnffgd and Nfpd information elements. By using the VnfProfile/PnfProfile/NsProfile, the user can limit the scope of VNFD/PNFD/(nested)NSD to a specific profile, which means the user can use the profile for different purposes (e.g. above-mentioned examples of traffic A and B).

The standard document ETSI GS NFV-IFA 014 defines information elements related to the VNF Forwarding Graph Descriptor (VNFFGD), Network Forwarding Path Descriptor (NFPD), Connection Point Descriptor Pool (CpdPool) and Connection Point Profile (CpProfile). The following paragraphs provide modified sections of the ETSI GS NFV-IFA 014 document in accordance with the above explanations.

Vnffgd Information Element

Description: The Vnffgd information element specifies a topology of connectivity of a NS and optionally forwarding rules applicable to the traffic conveyed over this topology.

Attributes: The attributes of the Vnffgd information element shall follow the indications provided in table 1.

TABLE 1

Attributes of the Vnffgd information element

| Attribute | Qualifier | Cardinality | Content | Description |
| --- | --- | --- | --- | --- |
| vnffgdId | M | 1 | Identifier | Identifier of this Vnffgd information element. It uniquely identifies a VNFFGD. |
| vnfProfileId | M | 0 . . . N | Identifier (Reference toVnfProfile) | References the VnfProfile of a constituent VNF. See notes 1 and 2. |
| pnfProfileId | M | 0 . . . N | Identifier (Reference to PnfProfile) | References the PnfProfile of a constituent PNF. See notes 1 and 2. |
| virtualLinkProfileId | M | 1 . . . N | Identifier (Reference to VirtualLinkProfile) | References the VirtualLinkProfile of a constituent VL. See note 3. |
| nsProfileId | M | 0 . . . N | Identifier (Reference to NsProfile) | References the NsProfile of a nested NS. See notes 1 and 2. |
| cpdPoolId | M | 1 . . . N | Identifier (Reference to CpdPool) | A reference to a pool of descriptors of connection points attached to one of the constituent VNFs and PNFs and/or one of the SAPs of the parent NS or of a nested NS. |
| nfpd | M | 0 . . . N | Nfpd | The network forwarding path associated to the VNFFG. See clause 6.4.3. |

NOTE 1:
The list of constituent VNFs, PNFs, and nested NS SAPs of a VNFFG can be identical to the list of constituent VNFs, PNFs and nested NSs of the parent NSD, or can be a subset of it.
NOTE 2:
The presence of a VnfProfile or PnfProfile or NsProfile identifier in a VNFFGD does not imply that all connection points instantiated from all embedded CPDs are connected to the VNFFG instantiated using the VNFFGD.
NOTE 3:
The presence of a VirtualLinkProfile identifier in a VNFFGD does not imply that all connection points of the VLs instantiated using this VL are connected to the VNFFG instantiated using the VNFFGD.

Nfpd Information Element

Description: The Nfpd information element associates 40 traffic flow criteria to a list of descriptors associated to the connection points and service access points to be visited by traffic flows matching these criteria.

Attributes: The attributes of the Nfpd information element shall follow the indications provided in table 2.

TABLE 2

Attributes of the Nfpd information element

| Attribute | Qualifier | Cardinality | Content | Description |
| --- | --- | --- | --- | --- |
| nfpId | M | 1 | Identifier | Identifies this nfpd information element within a VNPEGD. |
| nfpRule | M | 0 . . . 1 | Rule | Provides an NEP classification and selection rule. The rule may be expressed as a criteria constructed out of atomic assertions linked by Boolean operators AND, OR and NOT. See note 1. |
| cpProfileId | M | 1 . . . N | Identifier (Reference to CpProfile) | References the descriptor of a connection point to be traversed by the traffic flows matching the criteria. This shall be a connection point profile, which is either a CPD associated with |

TABLE 2-continued

Attributes of the Nfpd information element

| Attribute | Qualifier | Cardinality | Content | Description |
|---|---|---|---|---|
| | | | | the VnfProfile of a constituent VNF, or a CPD associated with the PnfProfile of a constituent PNF, or a SAPD associated with the NsProfile of a nested NS. See note 2. |

NOTE 1:
Examples of atomic assertions are assertions on packet header fields' values, date and time ranges, etc.
NOTE 2:
When multiple values are provided, the order is significant and specifies the sequence of connection points to be traversed.

CpdPool Information Element
Description: The CpdPool information element specifies a pool of descriptors of connection points and service access points.
Attributes: The attributes of the CpdPool information element shall follow the indications provided in table 3.

TABLE 3

Attributes of the CpdPool information element

| Attribute | Qualifier | Cardinality | Content | Description |
|---|---|---|---|---|
| cpdPoolId | M | 1 | Identifier | Identifier of this CpdPool information element. It identifies a pool of descriptors of connection points and NS SAPs. |
| cpProfileId | M | 1 ... N | Identifier (Reference to CpProfile) | A reference to the descriptor of a connection point profile, which is either a CPD associated with the VnfProfile of a constituent VNF, or a CPD associated with the PnfProfile of a constituent PNF, or a SAPD associated with the NsProfile of a nested NS. |

CpProfile Information Element
Description: The CpProfile information element specifies a CP or SAP descriptor for a given VnfProfile, PnfProfile or NsProfile.
Attributes: The attributes of the CpProfile information element shall follow the indications provided in table 4.

TABLE 4

Attributes of the CpProfile information element

| Attribute | Qualifier | Cardinality | Content | Description |
|---|---|---|---|---|
| cpProfileId | M | 1 | Identifier | Identifier of this CpProfile information element. It uniquely identifies a CpProfile. |
| vnfProfileId | M | 0 ... 1 | Identifier (Reference to VnfProfile) | Reference to the VnfProfile of a constituent VNF. See note 1 and note 4. |
| vnfExtCpdId | M | 0 ... 1 | Identifier (Reference to VnfExtCpd) | Identifier of the VNF external CPD for a given VnfProfile identified by the "vnfProfileId" attribute. See note 1 and note 4. |
| pnfProfileId | M | 0 ... 1 | Identifier (Reference to PnfProfile) | Reference to the PnfProfile of a constituent PNF. See note 2 and note 4. |
| pnfExtCpdId | M | 0 ... 1 | Identifier (Reference to PnfExtCpd) | Identifier of the PNF external CPD for a given PnfProfile identified by the "pnfProfileId" attribute. See note 2 and note 4. |
| nsProfileId | M | 0 ... 1 | Identifier (Reference to NsProfile) | References the NsProfile of a nested NS. See note 3 and note 4. |

TABLE 4-continued

Attributes of the CpProfile information element

| Attribute | Qualifier | Cardinality | Content | Description |
|---|---|---|---|---|
| nsSapdId | M | 0 . . . 1 | Identifier (Reference to Sapd) | Identifier of the NS SAPD for a given NsProfile identified by the "nsProfileId" attribute. See note 3 and note 4. |

NOTE 1:
for the VNF external CPD, both vntProfileId and vnfExtCpdId shall be present as a pair.
NOTE 2:
for the PNF external CPD, both pnfProfileId and pnfExtCpdId shall be present as a pair.
NOTE 3:
for the SAPD, both nsProfileId and nsSapdId shall be present as a pair.
NOTE 4:
one pair of identifiers (VNF external CPD, PNF external CPD or SAPP) shall be present.

Reference is made to TOSCA Simple Profile for Network Functions Virtualization (NFV) Version 1.0, which provides an example framework in which some embodiments may be implemented. The following paragraphs comprise text extracted from the TOSCA Simple Profile for Network Functions Virtualization (NFV) Version 1.0 reference.

The TOSCA metamodel uses the concept of service templates to describe cloud workloads as a topology template, which is a graph of node templates modeling the components a workload is made up of and as relationship templates modeling the relations between those components. TOSCA further provides a type system of node types to describe the possible building blocks for constructing a service template, as well as relationship type to describe possible kinds of relations. Both node and relationship types may define lifecycle operations to implement the behavior an orchestration engine can invoke when instantiating a service template.

The deployment template in NFV fully describes the attributes and requirements necessary to realize a Network Service. NFV Orchestrator (NFVO) manages the lifecycle of network service, manage the VNF lifecycle via the interface exposed by the VNF Manager (VNFM), and manages virtualized resources via the interfaces exposed by the VIM. The deployment template for a network service in NFV is called a network service descriptor (NSD), it describes a relationship between VNFs and possibly PNFs that it contains and the links needed to connect VNFs.

There are four information elements defined apart from the top level Network Service (NS) information element: Virtualized Network Function (VNF) information element, Physical Network Function (PNF) information element, Virtual Link (VL) information element, VNF Forwarding Graph (VNFFG) information element.

A VNF Descriptor (VNFD) is a deployment template which describes a VNF in terms of its deployment and operational behavior requirements. A VNF Forwarding Graph Descriptor (VNFFGD) is a deployment template which describes a topology of the Network Service or a portion of the Network Service, by referencing VNFs and PNFs and Virtual Links that connect them. A Virtual Link Descriptor (VLD) is a deployment template which describes the resource requirements that are needed for a link between VNFs, PNFs and endpoints of the Network Service, which could be met by various link options that are available in the NFVI. A Physical Network Function Descriptor (PNFD) describes the connectivity, Interface and KPIs requirements of Virtual Links to an attached Physical Network Function.

The NFVO receives all descriptors and on-boards the descriptors to the catalogues. NSD, VNFFGD, and VLD are "on-boarded" into a NS Catalogue; VNFD is on-boarded in a VNF Catalogue, as part of a VNF Package. At the instantiation procedure, the sender (operator) sends an instantiation request which contains instantiation input parameters that are used to customize a specific instantiation of a network service or VNF. Instantiation input parameters contain information that identifies a deployment flavour to be used and those parameters used for the specific instance.

The Network Service Descriptor (NSD) is a deployment template which consists of information used by the NFV Orchestrator (NFVO) for life cycle management of an NS [ETSI GS NFV-IFA 014]. The description of a NS as used by the NFV Management and Orchestration (MANO) functions to deploy an NS instance includes or references the descriptors of its constituent objects: zero, one or more Virtualised Network Function Descriptors (VNFD); zero, one or more Physical Network connect PNFs to VLs; zero, one or more nested NSD.

In NFV, the properties, relationships, and other metadata of the connections are specified in Virtual Link abstractions. To model how virtual links connect to virtual network functions, NFV introduces uses Connection Points (CPs) that represent the virtual and/or physical interfaces of the VNFs and their associated properties and other metadata.

A VNFD is a deployment template which describes a VNF in terms of deployment and operational behavior requirements. It also contains connectivity, interface and virtualized resource requirements [ETSI GS NFV-IFA 011]. The main parts of the VNFD are the following: VNF topology: it is modeled in a cloud agnostic way using virtualized containers and their connectivity. Virtual Deployment Units (VDU) describe the capabilities of the virtualized containers, such as virtual CPU, RAM, disks; their connectivity is modeled with VDU Connection Point Descriptors (VduCpd), Virtual Link Descriptors (Vld) and VNF External Connection Point Descriptors (VnfExternalCpd); VNF deployment aspects: these are described in one or more deployment flavours, including configurable parameters, instantiation levels, placement constraints (affinity/antiaffinity), minimum and maximum VDU instance numbers. Horizontal scaling is modeled with scaling aspects and the respective scaling levels in the deployment flavours; VNF lifecycle management (LCM) operations: describes the LCM operations supported per deployment flavour, and their input parameters; note, that the actual LCM implementation resides in a different layer, namely referring to additional template artifacts.

VNF deployment aspects: these are described in one or more deployment flavours, including instantiation levels, supported LCM operations, VNF LCM operation configuration parameters, placement constraints (affinity/anti-affinity), minimum and maximum VDU instance numbers, and scaling aspect for horizontal scaling.

Below are provided two example embodiments of NSDs relating to FIGS. 5 and 6, with VNFFG using abstract entities of VNFD.

Example embodiment relating to FIG. 5:

```
tosca_definitions_version: tosca_simple_profile_for_nfv_1_0_0
metadata:
    ns_id: example
    ns_name: example
    ns_designer: example
    ns_version: 1.0
description: NSD with VNFFG using VNFD
topology_template:
    substitution_mappings:
        node_type: tosca.nodes.nfv.NS
        capabilities:
            deployment_flavour:
                properties:
                    flavour_id: small
                    vnf_profile:
                        vnf_profile_a:
                            vnfd_id: VNFD_A
                            vnf_flavour_id: xxxx
                            min_number_of_instances: 1
                            max_number_of_instances: 1
                        vnf_profile_b:
                            vnfd_id: VNFD_B
                            vnf_flavour_id: xxxx
                            min_number_of_instances: 1
                            max_number_of_instances: 1
                        vnf_profile_dba:
                            vnfd_id: VNFD_DB
                            vnf_flavour_id: xxxx
                            min_number_of_instances: 1
                            max_number_of_instances: 1
                        vnf_profile_dbb:
                            vnfd_id: VNFD_DB
                            vnf_flavour_id: xxxx
                            min_number_of_instances: 1
                            max_number_of_instances: 1
                    vl_profile:
                        ..:
                    instantiation_levels:
                        ..:
                    default_instantiation_level: xxxx
        interfaces:
            Basic:
                instantiate:
                terminate:
    node_templates:
        vnf_a:
            type: tosca.nodes.nfv.VNF
            properties:
                description: VNF A
                vnfd_id:VNFD_A
            requirements:
                -   vnf_profile: vnf_profile_a
        vnf_b:
            type: tosca.nodes.nfv.VNF
            properties:
                description: VNF B
                vnfd_id:VNFD_B
            requirements:
                -   vnf_profile: vnf_profile_b
        vnf_dba:
            type: tosca.nodes.nfv.VNF
            properties:
                description: VNF DB A
                vnfd_id:VNFD_DB
            requirements:
                -   vnf_profile: vnf_profile_dba
        vnf_dbb:
            type: tosca.nodes.nfv.VNF
            properties:
                description: VNF DB B
                vnfd_id:VNFD_DB
            requirements:
                -   vnf_profile: vnf_profile_dbb
        forwarding_path1:
            type: tosca.nodes.nfv.FP
            description: creates path (vnf_a_ecp2->vnf_dba_ecp1)
            properties:
                policy:
                    ..:
                path:
                    -   forwarder: VNFD_A
                        capability: ECP_A2
                    -   forwarder: VNFD_DB
                        capability: ECP_DB1
        forwarding_path2:
            type: tosca.nodes.nfv.FP
            description: creates path (vnf_b_ecp2->vnf_dbb_ecp1)
            properties:
                policy:
                    ..:
                path:
                    -   forwarder: VNFD_B
                        capability: ECP_B2
                    -   forwarder: VNFD_DB
                        capability: ECP_DB1
    groups:
        VNFFG1:
            type: tosca.groups.nfv.VNFFG
            description: xxxxxx
            properties:
                number_of_endpoints: 3
                connection_point: [ECP_A2,ECP_B2,ECP_DB1]
                constituent_vnfs: [VNFD_A,VNFD_B,VNFD_DB]
                members: [forwarding_path1,forwarding_path2]
```

Example embodiment relating to FIG. 6:

```
tosca_definitions_version: tosca_simple_profile_for_nfv_1_0_0
metadata:
    ns_id: example
    ns_name: example
    ns_designer: example
    ns_version: 1.0
description: NSD with VNFFG using VNFD
topology_template:
    substitution_mappings:
        node_type: tosca.nodes.nfv.NS
        capabilities:
            deployment_flavour:
                properties:
                    flavour_id: small
                    vnf_profile:
                        vnf_profile_a:
                            vnfd_id: VNFD_A
                            vnf_flavour_id: xxxx
                            min_number_of_instances: 1
```

```
                                    max_number_of_instances: 3
                                vnf_profile_b:
                                    vnfd_id: VNFD_B
                                    vnf_flavour_id: xxxx
                                    min_number_of_instances: 1
                                    max_number_of_instances: 3
                                vnf_profile_dba:
                                    vnfd_id: VNFD_DB
                                    vnf_flavour_id: xxxx
                                    min_number_of_instances: 1
                                    max_number_of_instances: 2
                                vnf_profile_dbb:
                                    vnfd_id: VNFD_DB
                                    vnf_flavour_id: xxxx
                                    min_number_of_instances: 1
                                    max_number_of_instances: 2
                            vl_profile:
                                ..:
                            instantiation_levels:
                                ..:
                            default_instantiation_level: xxxx
                interfaces:
                    Basic:
                        instantiate:
                        terminate:
    node_templates:
        vnf_a:
            type: tosca.nodes.nfv.VNF
            properties:
                description: VNF A
                vnfd_id:VNFD_A
            requirements:
                -       vnf_profile: vnf_profile_a
        vnf_b:
            type: tosca.nodes.nfv.VNF
            properties:
                description: VNF B
                vnfd_id:VNFD_B
            requirements:
                -       vnf_profile: vnf_profile_b
        vnf_dba:
            type: tosca.nodes.nfv.VNF
            properties:
                description: VNF DB A
                vnfd_id:VNFD_DB
            requirements:
                -       vnf_profile: vnf_profile_dba
        vnf_dbb:
            type: tosca.nodes.nfv.VNF
            properties:
                description: VNF DB B
                vnfd_id:VNFD_DB
            requirements:
                -       vnf_profile: vnf_profile_dbb
        forwarding_path1:
            type: tosca.nodes.nfv.FP
            description: creates path (vnf_a_ecp2->vnf_dba_ecp1)
            properties:
                policy:
                    ..:
                path:
                    -       forwarder: vnf_profile_a
                            capability: ECP_A2
                    -       forwarder: vnf_profile_dba
                            capability: ECP_DB1
        forwarding_path2:
            type: tosca.nodes.nfv.FP
            description: creates path (vnf_b_ecp2->vnf_dbb_ecp1)
            properties:
                policy:
                    ..:
                path:
                    -       forwarder: vnf_profile_b
                            capability: ECP_B2
                    -       forwarder: vnf_profile_dbb
                            capability: ECP_DB1
    groups:
        VNFFG1:
            type: tosca.groups.nfv.VNFFG
```

```
        description: xxxxxx
        properties:
            number_of_endpoints: 4
            connection_point: [ECP_A2,ECP_B2,ECP_DB1,ECP_DB1]
            constituent_vnfs:
[vnf_profile_a,vnf_profile_b,vnf_profile_dba,vnf_profile_dbb]
            members: [forwarding_path1,forwarding_path2]
```

Figure 7A:
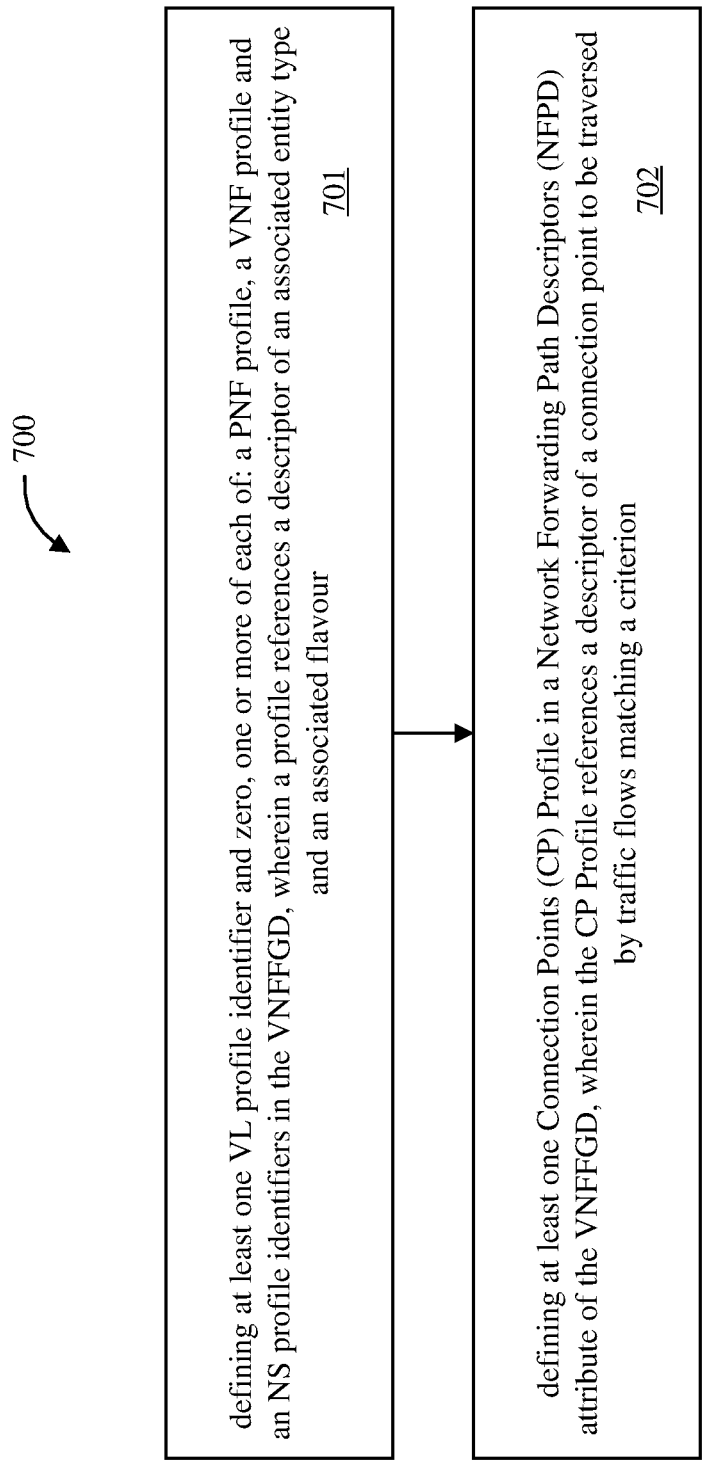
FIG. 7a is a flowchart of a method according to an embodiment.

FIG. 7a illustrates an embodiment, providing a method 700 for defining a Network Service Descriptor (NSD) for a Network Service (NS), comprising zero, one or more of each of: a Virtualized Network Function (VNF) Descriptor (VNFD), a Physical Network Function (PNF) Descriptor (PNFD), a Network Service Descriptor (NSD), a Virtual Link (VL) Descriptor (VLD), and a VNF Forwarding Graph Descriptor (VNFFGD), the method comprising the steps of:
- defining, step 701, at least one VL profile identifier and zero, one or more of each of: a PNF profile, a VNF profile and an NS profile identifiers in the VNFFGD, wherein a profile references a descriptor of an associated entity type and an associated flavour; and
- defining, step 702, at least one Connection Points (CP) Profile in a Network Forwarding Path Descriptors (NFPD) attribute of the VNFFGD, wherein the CP Profile references a descriptor of a connection point to be traversed by traffic flows matching a criterion.

The method, wherein two VNF profiles reference a same VNFD and have a same type and wherein the two VNF profiles are used in VNF Forwarding Graphs (VNFFGs), or in Network Forwarding Paths (NFPs) with different interconnections.

FIG. 7b illustrates an embodiment, providing a method 730 for modifying or refining a Network Service Descriptor (NSD) for a Network Service (NS), the method comprising:
- allowing, step 731, abstract entities as indirect references in place of direct references in the NSD wherein the direct references are any of Virtualized Network Function (VNF) Descriptor (VNFD), Physical Network Function (PNF) Descriptor (PNFD), Network Service Descriptor (NSD) and Virtual Link (VL) Descriptors (VLD).

The method further comprising replacing direct references used in a VNF Forwarding Graph Descriptor (VNFFGD) with abstract entities.

The method further comprising replacing direct references used in Network Forwarding Path Descriptors (NFPDs) with abstract entities.

Figure 7C:
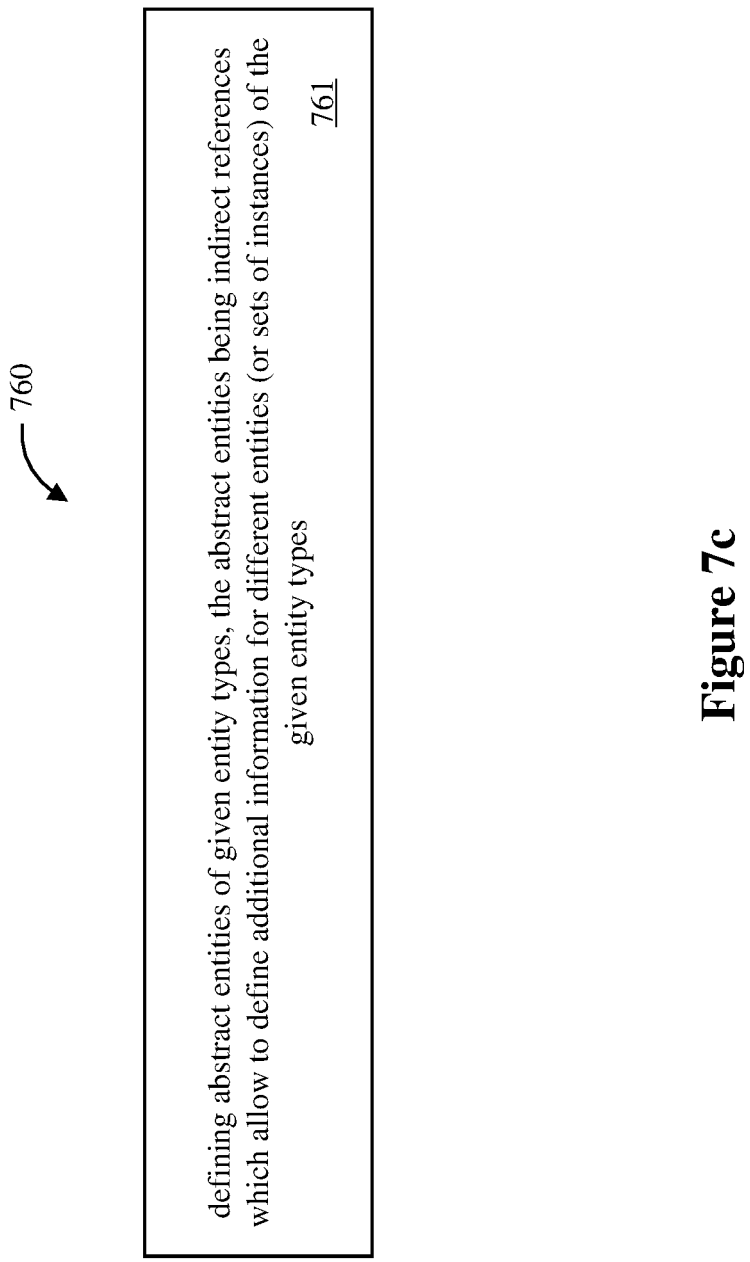
FIG. 7c is a flowchart of a method according to an embodiment.

FIG. 7c illustrates an embodiment, providing a method 760 for defining a Network Service Descriptor (NSD) for a Network Service (NS), the method comprising:
- defining, step 761, abstract entities of given entity types, the abstract entities being indirect references which allow to define additional information for different entities (or sets of instances) of the given entity types.

The method wherein the additional information comprises any of a role or a function, a flavour, a number of instances to be created, a collocation policy or a connectivity of instances within the NS.

The method wherein the abstract entities are profiles such as VNF profiles, PNF profiles, NS profiles, VL Profiles, CP Profiles and SAP Profiles.

The method wherein multiple abstract entities are allowed for each entity type.

The method wherein a different abstract entity is defined in the VNFFGDs and NFPDs each time an instance of an entity type is used differently.

The method wherein the abstract entities allow to define associations of the NSD to other entities.

The method wherein the other entities are specific VNF entities.

According to an embodiment, there is provided a method for defining a Network Service Descriptor (NSD) for a Network Service (NS), the NSD comprising:
- zero, one or more Virtualized Network Function (VNF) Descriptor (VNFD),
- zero, one or more Physical Network Function (PNF) Descriptor (PNFD), wherein the information contained within the PNFD is limited to a description of the connectivity requirements to integrate PNFs in an NS,
- zero, one or more nested Network Service Descriptor (NSD),
- at least one of the VNFD or NSD,
- zero, one or more Virtual Link (VL) Descriptors (VLD), and
- zero, one or more VNF Forwarding Graph Descriptors (VNFFGD), wherein the VNFFGD describes a topology or a portion of the NS, the method comprising the steps of:
- defining at least one VL profile identifier and zero, one or more PNF profile, VNF profile and NS profile identifiers in the VNFFGD, wherein a presence of profile identifiers in the VNFFGD indicates a subset of connection points instantiated from all embedded CP Descriptors (CPDs) are connected to an instantiated VNF Forwarding Graph (VNFFG) using the VNFFGD, wherein a presence of a VL Profile identifier in the VNFFGD indicates a subset of connection points of the VLs instantiated using the VL are connected to the VNFFG instantiated using the VNFFGD; and
- defining at least one CP Profile in a NFPD attribute of the VNFFGD, wherein the CP Profile references a descriptor of a connection point to be traversed by traffic flows matching a criteria, wherein the CP Profile, is either a CPD associated with the VnfProfile of a constituent VNF, a CPD associated with the PnfProfile of a constituent PNF, or a SAP Descriptor (SAPD) associated with the NsProfile of a nested NS.

The method wherein multiple abstract entities are allowed for each entity type.

The method wherein the CP Profile is an information element comprising:
- at least one CP Profile Identifier (ID) uniquely identifying the CP Profile;
- zero or one VNF Profile ID referencing to a VNF Profile of a constituent VNF;
- zero or one VNF external CPD identifier the VNF external CPD for the VNF profile;
- zero or one PNF Profile ID referencing to a PNF Profile of a constituent PNF;

zero or one PNF external CPD identifier of the PNF external CPD for the PNF Profile;

zero or one NS Profile ID referencing to a NsProfile of a nested NS; and zero or one NS SAPD ID of the NS SAPD for the NsProfile.

FIG. 7d illustrates an embodiment, providing a method for defining a Network Service Descriptor (NSD) for a Network Service (NS), the NSD comprising zero, one or more of each of: a Virtualized Network Function (VNF) Descriptor (VNFD), a Physical Network Function (PNF) Descriptor (PNFD), a Network Service Descriptor (NSD), a Virtual Link (VL) Descriptor (VLD), and a VNF Forwarding Graph Descriptor (VNFFGD). The method comprises: defining, step 791, at least one Connection Points (CP) Profile, wherein the CP Profile is referenced through a cpProfileId in a Network Forwarding Path Descriptor (NFPD) attribute of the VNFFGD; the CP Profile specifying a Connection Point Descriptor (CPD) or Service Access Point Descriptor (SAPD) for a given VnfProfile, PnfProfile or NsProfile.

The method wherein a usage of CP profiles enables differentiating multiple CPDs or SAPDs specified in a same VNFD, PNFD or NSD that are applicable to different VNF, PNF or NS instances derived from the same VNFD, PNFD or NSD.

The method wherein the CP Profile is an information element comprising: at least one CP Profile Identifier (ID) uniquely identifying the CP Profile; zero or one VNF Profile ID referencing to a VNF Profile of a constituent VNF; zero or one VNF external CPD identifier of a VNF external CPD for the VNF profile; zero or one PNF Profile ID referencing to a PNF Profile of a constituent PNF; zero or one PNF external CPD identifier of a PNF external CPD for the PNF Profile; zero or one NS Profile ID referencing to a NsProfile of a nested NS; and zero or one NS SAPD ID of the NS SAPD for the NsProfile.

There is also provided a method for defining a Network Service Descriptor (NSD) for a Network Service (NS), the NSD comprising: zero, one or more Virtualized Network Function (VNF) Descriptor (VNFD), zero, one or more Physical Network Function (PNF) Descriptor (PNFD), wherein information contained within the PNFD is limited to a description of connectivity requirements to integrate PNFs in the NS, zero, one or more nested Network Service Descriptor (NSD), wherein the zero, one or more NSD references either one VNFD or a nested NSD, zero, one or more Virtual Link (VL) Descriptors (VLD), and zero, one or more VNF Forwarding Graph Descriptors (VNFFGD), the VNFFGD describing a topology or a portion of the NS. The method comprises: defining at least one Connection Points (CP) Profile, wherein the CP Profile is referenced through a cpProfileId in a Network Forwarding Path Descriptor (NFPD) attribute of the VNFFGD; the CP Profile specifying a Connection Point Descriptor (CPD) or Service Access Point Descriptor (SAPD) for a given VnfProfile, PnfProfile or NsProfile.

The method wherein a usage of CP profiles enables differentiating multiple CPDs or SAPDs specified in a same VNFD, PNFD or NSD that are applicable to different VNF, PNF or NS instances derived from the same VNFD, PNFD or NSD.

The method wherein the CP Profile is an information element comprising: at least one CP Profile Identifier (ID) uniquely identifying the CP Profile; zero or one VNF Profile ID referencing to a VNF Profile of a constituent VNF; zero or one VNF external CPD identifier of a VNF external CPD for the VNF profile; zero or one PNF Profile ID referencing to a PNF Profile of a constituent PNF; zero or one PNF external CPD identifier of a PNF external CPD for the PNF Profile; zero or one NS Profile ID referencing to a NsProfile of a nested NS; and zero or one NS SAPD ID of the NS SAPD for the NsProfile.

Figure 8:
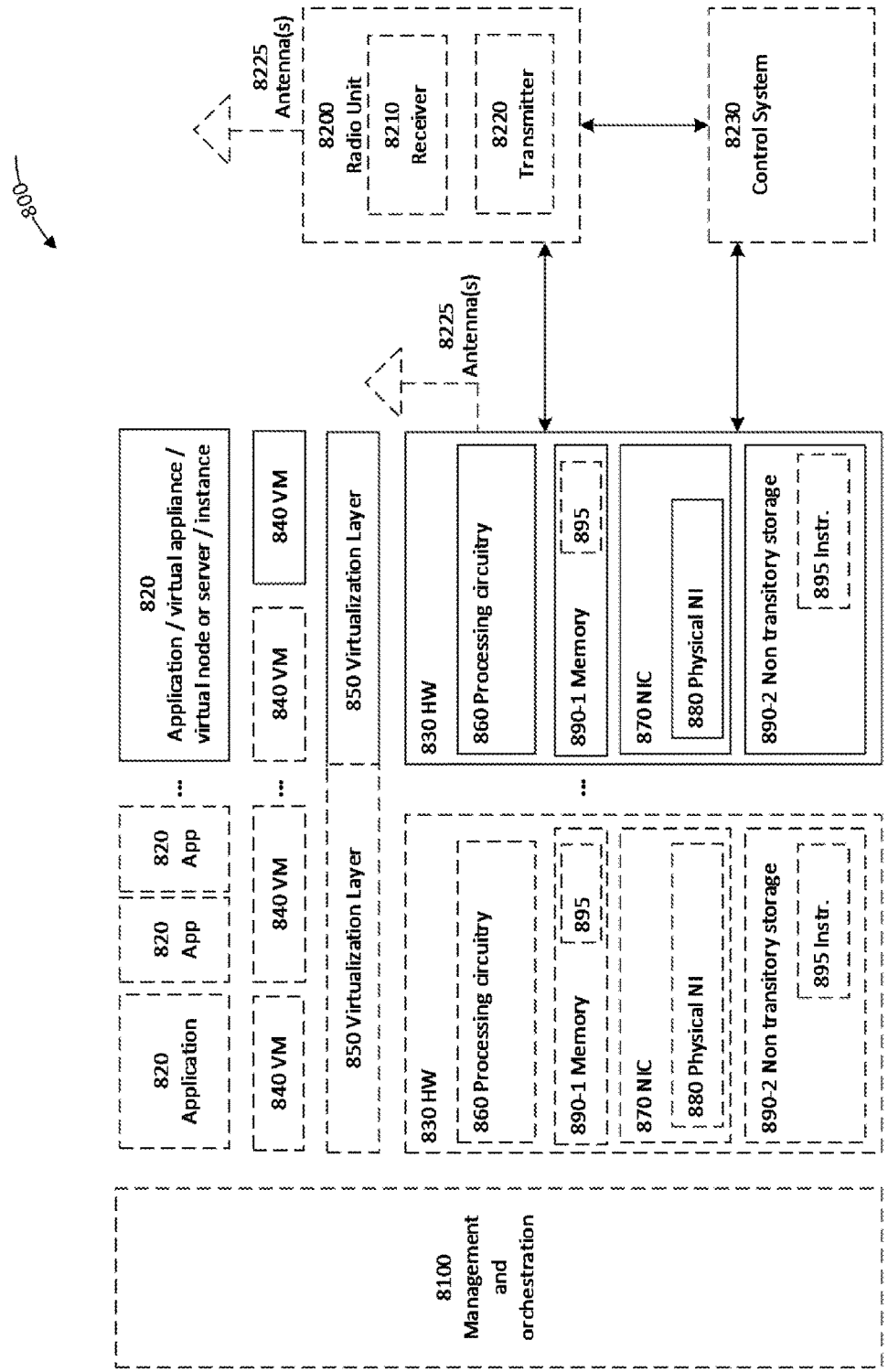
FIG. 8 is a schematic illustration of a virtualization environment in accordance with some embodiments.

According to an embodiment, there is provided a system, such as illustrated in FIG. 8, comprising processing circuits and a memory, the memory containing instructions executable by the processing circuits whereby the system is operative to execute at least some of the functions described herein.

According to an embodiment, there is provided a non-transitory computer readable media, such as illustrated in FIG. 8, having stored thereon instructions for executing at least some of the functions described herein.

According to an embodiment there is provided a server/apparatus/node instance, such as illustrated in FIG. 8, in a cloud computing environment which provides processing and interface circuits and memory for running the server/apparatus/node instance, the memory containing instructions executable by the processing circuits whereby the server/apparatus/node instance is operative to execute at least some of the functions described herein.

There are, proposed herein, various embodiments which address one or more of the issues disclosed herein.

Certain embodiments may provide one or more of the following technical advantage(s). The proposed approach removes the ambiguity of the current NSD and allows clear specification of the VNFFGs and NFPs within the NS. This also means that whoever designs the NS can specify where (in which forwarding path (i.e. NFP) for which VNF instances) and what forwarding rules and policies should apply, which can then be applied as soon as the NSD is deployed. It does not require runtime tweaking and updates and by that it allows better automation of the design process.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station, a virtualized radio access node or any other node able to provide a network service) or to a device (e.g., a UE, a wireless device or any other type of communication device capable of using a network service) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node or any other type of node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and may correspond to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

There is provided a Network Functions Virtualisation (NFV) Orchestrator (NFVO) executed on a network node 830 comprising processing circuitry 860 and a memory 890, the memory containing instructions executable by the processing circuitry whereby said NFVO is operative to instantiate a Network service (NS) defined by a Network Service Descriptor (NSD), the NSD comprising zero, one or more of each of: a Virtualized Network Function (VNF) Descriptor (VNFD), a Physical Network Function (PNF) Descriptor (PNFD), a Network Service Descriptor (NSD), a Virtual Link (VL) Descriptor (VLD), and a VNF Forwarding Graph Descriptor (VNFFGD), the NSD comprising at least one Connection Points (CP) Profile, wherein the CP Profile is referenced through a cpProfileId in a Network Forwarding Path Descriptor (NFPD) attribute of the VNFFGD, the CP Profile specifying a Connection Point Descriptor (CPD) or Service Access Point Descriptor (SAPD) for a given VnfProfile, PnfProfile or NsProfile.

There is provided a Network Functions Virtualisation (NFV) Orchestrator (NFVO) executed on a network node 830 comprising processing circuitry 860 and a memory 890, the memory containing instructions executable by the processing circuitry whereby said NFVO is operative to instantiate a Network service (NS) defined by a Network Service Descriptor (NSD). The NSD comprises: zero, one or more Virtualized Network Function (VNF) Descriptor (VNFD), zero, one or more Physical Network Function (PNF) Descriptor (PNFD), wherein information contained within the PNFD is limited to a description of the connectivity requirements to integrate PNFs in the NS, zero, one or more nested Network Service Descriptor (NSD), wherein the zero, one or more NSD references either one VNFD or a nested NSD, zero, one or more Virtual Link (VL) Descriptors (VLD), and zero, one or more VNF Forwarding Graph Descriptors (VNFFGD), the VNFFGD describing a topology or a portion of the NS, the NSD comprising at least one Connection Points (CP) Profile, wherein the CP Profile is referenced through a cpProfileId in a Network Forwarding Path Descriptor (NFPD) attribute of the VNFFGD, the CP Profile specifying a Connection Point Descriptor (CPD) or Service Access Point Descriptor (SAPD) for a given VnfProfile, PnfProfile or NsProfile.

In some embodiments, some signalling can be effected with the use of control system 8230 which may alternatively be used for communication between the hardware nodes 830 and radio units 8200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method implemented in a network node, the network node comprising a Network Function Virtualization Orchestrator (NFVO) and being configured to instantiate a Network Service (NS), the method comprising:
   determining a Network Service Descriptor (NSD), the determined NSD including at least a Virtualized Network Function (VNF) Forwarding Graph Descriptor (VNFFGD), the VNFFGD including a Network Forwarding Path Descriptor (NFPD) attribute, the determined NSD defining at least one Connection Points (CP) Profile, the at least one CP Profile being referenced through a CP Profile identifier in the NFPD attribute of the VNFFGD, the at least one CP Profile including at least:
      a first CP profile specifying at least one of a first Connection Point Descriptor (CPD) and a first Service Access Point Descriptor (SAPD) for at least one of a Virtualized Network Function (VNF) Profile, a Physical Network Function (PNF) Profile, and an NS Profile; and
      a second CP profile specifying at least one of a second CPD and a second SAPD for at least one of the VNF Profile, the PNF Profile, and the NS Profile;
   at least one of: (a) the first CPD and the second CPD, and (b) the first SAPD and the second SAPD, being:
      different;
      specified in a same one of a Virtualized Network Function Descriptor (VNFD), Physical Network Function Descriptor (PNFD), and NSD; and
      applicable to different VNF, PNF, and NS instances derived from the same one of the VNFD, PNFD, and NSD;
   instantiating the NS based on the determined NSD, the instantiated NS causing the network node to establish at least one network connection between at least two network functions of the network service; and
   at least one of the first CP Profile and the second CP Profile is an information element comprising:
      the CP Profile Identifier (ID) uniquely identifying the CP Profile;
      zero or one VNF Profile ID referencing to the VNF Profile of a constituent VNF;
      zero or one VNF external CPD identifier of a VNF external CPD for the VNF profile;
      zero or one PNF Profile ID referencing to the PNF Profile of a constituent PNF;
      zero or one PNF external CPD identifier of a PNF external CPD for the PNF Profile;
      zero or one NS Profile ID referencing to a NsProfile of a nested NS; and
      zero or one NS SAPD ID of the NS SAPD for the NsProfile.

2. The method of claim 1, wherein:
   the NSD includes at least one of the VNFD, the PNFD, the NSD, and a Virtual Link Descriptor (VLD);
   the CP Profile Identifier is a cpProfileId;
   the VNF Profile is a VnfProfile;
   the PNF Profile is a PnfProfile; and
   the NS Profile is the NsProfile.

3. A method implemented in a network node, the network node comprising a Network Function Virtualization Orchestrator (NFVO) and being configured to instantiate a Network Service (NS), the method comprising:
   determining a Network Service Descriptor (NSD), the determined NSD including at least a Virtualized Network Function (VNF) Forwarding Graph Descriptor (VNFFGD), the VNFFGD including a Network Forwarding Path Descriptor (NFPD) attribute and describing one of a topology and a portion of the NS, the determined NSD defining at least one Connection Points (CP) Profile, the at least one CP Profile being referenced through a CP Profile identifier in the NFPD attribute of the VNFFGD, the at least one CP Profile including at least:
      a first CP profile specifying at least one of a first Connection Point Descriptor (CPD) and a first Service Access Point Descriptor (SAPD) for at least one of a Virtualized Network Function (VNF) Profile, a Physical Network Function (PNF) Profile, and an NS Profile; and
      a second CP profile specifying at least one of a second CPD and a second SAPD for at least one of the VNF Profile, the PNF Profile, and the NS Profile;
   at least one of: (a) the first CPD and the second CPD, and (b) the first SAPD and the second SAPD, being:
      different;
      specified in a same one of a Virtualized Network Function Descriptor (VNFD), Physical Network Function Descriptor (PNFD), and NSD; and
      applicable to different VNF, PNF, and NS instances derived from the same one of the VNFD, PNFD, and NSD;
   instantiating the NS based on the determined NSD, the instantiated NS causing the network node to establish at least one network connection between at least two network functions of the network service; and
   at least one of the first CP Profile and the second CP Profile is an information element comprising:
      the CP Profile Identifier (ID) uniquely identifying the CP Profile;
      zero or one VNF Profile ID referencing to the VNF Profile of a constituent VNF;
      zero or one VNF external CPD identifier of a VNF external CPD for the VNF profile;
      zero or one PNF Profile ID referencing to the PNF Profile of a constituent PNF;
      zero or one PNF external CPD identifier of a PNF external CPD for the PNF Profile;
      zero or one NS Profile ID referencing to a NsProfile of a nested NS; and
      zero or one NS SAPD ID of the NS SAPD for the NsProfile.

4. The method of claim 3, wherein:
   the NSD includes at least one of the VNFD, the PNFD, the NSD, and a Virtual Link Descriptor (VLD), information contained within the PNFD being limited to a description of connectivity requirements to integrate PNFs in the NS, the NSD references one of a VNFD and a nested NSD;
the CP Profile Identifier is a cpProfileId;
the VNF Profile is a VnfProfile;
the PNF Profile is a PnfProfile; and
the NS Profile is the NsProfile.

5. A network node comprising a Network Functions Virtualization (NFV) Orchestrator (NFVO) and being configured to instantiate a Network Service (NS), the network node comprising processing circuitry and a memory, the memory containing instructions executable by the processing circuitry, the processing circuitry being configured to:
determine a Network Service Descriptor (NSD), the determined NSD including at least a Virtualized Network Function (VNF) Forwarding Graph Descriptor (VNFFGD), the VNFFGD including a Network Forwarding Path Descriptor (NFPD) attribute, the determined NSD defining at least one Connection Points (CP) Profile, the at least one CP Profile being referenced through a CP Profile identifier in the NFPD attribute of the VNFFGD, the at least one CP Profile including at least:
a first CP profile specifying at least one of a first Connection Point Descriptor (CPD) and a first Service Access Point Descriptor (SAPD) for at least one of a Virtualized Network Function (VNF) Profile, a Physical Network Function (PNF) Profile, and an NS Profile; and
a second CP profile specifying at least one of a second CPD and a second SAPD for at least one of the VNF Profile, the PNF Profile, and the NS Profile;
at least one of: (a) the first CPD and the second CPD, and (b) the first SAPD and the second SAPD, being:
different;
specified in a same one of a Virtualized Network Function Descriptor (VNFD), Physical Network Function Descriptor (PNFD), and NSD; and
applicable to different VNF, PNF, and NS instances derived from the same one of the VNFD, PNFD, and NSD;
instantiate the NS based on the determined NSD, the instantiated NS causing the network node to establish at least one network connection between at least two network functions of the network service; and
at least one of the first CP Profile and the second CP Profile is an information element comprising:
the CP Profile Identifier (ID) uniquely identifying the CP Profile;
zero or one VNF Profile ID referencing to the VNF Profile of a constituent VNF;
zero or one VNF external CPD identifier of a VNF external CPD for the VNF profile;
zero or one PNF Profile ID referencing to the PNF Profile of a constituent PNF;
zero or one PNF external CPD identifier of a PNF external CPD for the PNF Profile;
zero or one NS Profile ID referencing to a NsProfile of a nested NS; and
zero or one NS SAPD ID of the NS SAPD for the NsProfile.

6. A network node comprising a Network Functions Virtualization (NFV) Orchestrator (NFVO) and being configured to instantiate a Network Service (NS), the network node comprising processing circuitry and a memory, the memory containing instructions executable by the processing circuitry, the processing circuitry being configured to:
determine a Network Service Descriptor (NSD), the determined NSD including at least a Virtualized Network Function (VNF) Forwarding Graph Descriptor (VNFFGD), the VNFFGD including a Network Forwarding Path Descriptor (NFPD) attribute and describing one of a topology and a portion of the NS, the determined NSD defining at least one Connection Points (CP) Profile, the at least one CP Profile being referenced through a CP Profile identifier in the NFPD attribute of the VNFFGD, the at least one CP Profile including at least:
a first CP profile specifying at least one of a first Connection Point Descriptor (CPD) and a first Service Access Point Descriptor (SAPD) for at least one of a Virtualized Network Function (VNF) Profile, a Physical Network Function (PNF) Profile, and an NS Profile; and
a second CP profile specifying at least one of a second CPD and a second SAPD for at least one of the VNF Profile, the PNF Profile, and the NS Profile;
at least one of: (a) the first CPD and the second CPD, and (b) the first SAPD and the second SAPD, being:
different;
specified in a same one of a Virtualized Network Function Descriptor (VNFD), Physical Network Function Descriptor (PNFD), and NSD; and
applicable to different VNF, PNF, and NS instances derived from the same one of the VNFD, PNFD, and NSD;
instantiate the NS based on the determined NSD, the instantiated NS causing the network node to establish at least one network connection between at least two network functions of the network service; and
at least one of the first CP Profile and the second CP Profile is an information element comprising:
the CP Profile Identifier (ID) uniquely identifying the CP Profile;
zero or one VNF Profile ID referencing to the VNF Profile of a constituent VNF;
zero or one VNF external CPD identifier of a VNF external CPD for the VNF profile;
zero or one PNF Profile ID referencing to the PNF Profile of a constituent PNF;
zero or one PNF external CPD identifier of a PNF external CPD for the PNF Profile;
zero or one NS Profile ID referencing to a NsProfile of a nested NS; and
zero or one NS SAPD ID of the NS SAPD for the NsProfile.

* * * * *